United States Patent [19]

Müllner et al.

[11] Patent Number: 4,572,281
[45] Date of Patent: Feb. 25, 1986

[54] METHOD AND ARRANGEMENT FOR RECOVERING THE SENSIBLE HEAT OF SLAG

[75] Inventors: Paul Müllner, Traun; Bernhard Enkner, Linz, both of Austria

[73] Assignee: Voest-Alpine Aktiengesellschaft, Linz, Austria

[21] Appl. No.: 550,945

[22] Filed: Nov. 14, 1983

[30] Foreign Application Priority Data

Nov. 16, 1982 [AT] Austria .................................. 4170/82

[51] Int. Cl.⁴ .................. F27D 15/02; F27D 3/14; F22B 1/02
[52] U.S. Cl. .................................. 165/1; 122/27; 432/83; 165/104.34
[58] Field of Search .................. 122/27, 28; 432/77, 432/78, 79, 80, 83; 165/104.34

[56] References Cited

U.S. PATENT DOCUMENTS

| | | | |
|---|---|---|---|
| 4,362,504 | 12/1982 | Kajibawa et al. | 432/83 |
| 4,373,907 | 2/1983 | Kajibawa et al. | 432/83 |
| 4,420,304 | 12/1983 | Nakatani et al. | 432/83 |

FOREIGN PATENT DOCUMENTS

| | | |
|---|---|---|
| 0068943 | 1/1983 | European Pat. Off. . |
| 2498310 | 7/1982 | France . |
| 34038 | 3/1978 | Japan . |
| 84894 | 7/1978 | Japan . |

Primary Examiner—Albert W. Davis, Jr.
Attorney, Agent, or Firm—Brumbaugh, Graves, Donohue & Raymond

[57] ABSTRACT

To recover the sensible heat of slag the slag is allowed to solidify on the surface of a hollow cooling body provided with a liquid internal cooling and is indirectly cooled by the liquid internal cooling. The liquid cooling medium of the liquid internal cooling is guided in a thermodynamic cyclic process. In order to ensure as completely a recovery of the sensible heat of the slag as possible and a high percentage of glassy portions of the slag as well as a good grindability of the slag, the liquid slag on the surface of the cooling body is intensively cooled indirectly by the liquid cooling medium to a temperature of closely below the solidification temperature in a first cooling step. The solidified slag separated from the surface of the cooling body is then directly cooled by a gas flow in a second cooling step. The heated gas flow also is guided in a thermodynamic cyclic process.

5 Claims, 7 Drawing Figures

METHOD AND ARRANGEMENT FOR RECOVERING THE SENSIBLE HEAT OF SLAG

BACKGROUND OF THE INVENTION

The invention relates to a method for recovering the sensible heat of slag, in particular of blast furnace slag, wherein the liquid slag is allowed to solidify on the surface of a hollow cooling body provided with a liquid internal cooling and preferably designed as a cooling drum, and is indirectly cooled by the liquid internal cooling, the liquid cooling medium of the liquid internal cooling being guided in a thermodynamic cyclic process, as well as to an arrangement for carrying out the method.

A method of the initially defined kind is known from German Offenlegungsschrift No. 31 22 059 in which the slag is poured between two drums provided with internal cooling, the drum surfaces moving upwardly with the slag in the region of contact so that the slag is in contact with the drums over a long period of time and is cooled to a low temperature. The slag, which adheres to the drums over more than ¾ of the drum surfaces, is removeable from the drums only with difficulty and by the formation of relatively large pieces of slag. The drums are heated to a relatively high temperature by the slag covering them. As cooling is started, the temperature gradient is very low, rising only after a certain period of time, whereby the desired glassy solidification of the slag is not guaranteed.

A further method for recovering the sensible heat of slag is known from German Offenlegungsschrift No. 27 59 205. With this method, the slag is poured onto what is called a centrifugal wheel, which centrifugal wheel mechanically atomizes the slag and throws it away. During the slag's travel through the air after having been thrown away, the slag cools down, with a thin, still soft skin forming on the slag particles. During the relatively short flight of the slag particles through the air, a solidification all through of the same is not guaranteed so that the slag particles tend to agglomerate when subsequently impinging on one another. Therefore, it is necessary to add a powdery separating agent, which separating agent, as it partially remains adhered to the slag particles, restricts the fields of application of the slag particles and cannot be guided in circulation entirely on account of its adhering to the slag particles; it must be renewed all the time.

According to German Offenlegungsschrift No. 27 59 205 the slag particles, together with the separating agent, reach a vessel, through which air is streaming from bottom to top, cooling the slag particles. The air heated by the slag particles, after having passed a cyclone separator, serves to heat a medium in a heat exchanger. In the fluidized bed formed within the vessel by the slag particles as a result of the passage of air, a heat exchanging tube is arranged, which is subjected to a great mechanical wear.

Apart from the fact that with this known method the glassy solidification of the slag is not ensured and a separating agent must be used, as described above, the heat recovery is also insufficient because of the cooling is predominantly effected by air.

The invention has as its object to eliminate these disadvantages and difficulties and has as its object to provide a method, as well as an arrangement for carrying out the method, which makes feasible as completely as possible a recovery of the sensible heat of the slag, wherein, however, a high percentage of glassy portions of the slag and a good grindability of the slag are ensured.

SUMMARY OF THE INVENTION

This object is achieved according to the invention in that the liquid slag on the surface of the cooling body is intensively cooled indirectly by means of the liquid cooling medium to a temperature of closely below the solidification temperature in a first cooling step and the solidified slag separated from the surface of the cooling body is directly cooled by means of a gas flow in a second cooling step, the heated gas flow also being guided in a thermodynamic cyclic process.

Suitably, the slag is cooled to about 1,100° C. by means of the liquid cooling medium and from about 1,100° C. to about 200° C. by means of the gaseous medium.

According to a preferred embodiment, with which a particularly high thermal yield is realized, the heat absorbed by the gas flow is supplied to the cooling medium heated by the slag, the liquid cooling medium suitably being guided in a closed cycle under an elevated pressure and the gas flow, furthermore, suitably being guided in a closed cycle.

An arrangement for carrying out the method, comprising a cooling body, preferably a cooling drum, defining a cavity, through which a liquid cooling medium flows, and at least one slag supply duct reaching to the surface of the cooling body, the cavity of the cooling body being connected in duct-like manner with a heat transformer of a thermodynamic cyclic process by means of a drainage for the liquid cooling medium entering into the cavity, is characterized in that a substantially vertical vessel passed through by the slag separated from the surface of the cooling body is provided, into which a cooling gas entrance duct enters near its lower end and a cooling gas exit duct enters near its upper end, the cooling gas exit duct being connected to a further heat transformer of a thermodynamic cyclic process.

For the purpose of a particularly efficient recovery of the sensible heat, the heat transformer of the thermodynamic cyclic process of the cooling gas is penetrated by the drainage for the liquid medium.

According to a preferred embodiment, the cooling body is formed by two counterwise-driven casting rolls and, furthermore, is arranged in the interior of the vessel near its upper end.

Suitably, the drainage for the liquid cooling medium is connected in a closed cycle with a cooling-liquid supply conduit entering into the cavity of the cooling body and, furthermore, the cooling gas entrance duct is connected in a closed cycle with the cooling gas exit duct via the heat exchanger.

A particularly favorable solidification of the slag is ensured if the cooling body is provided with elevations and recesses extending in the peripheral direction, the recesses suitably being designed as grooves extending over the periphery of the cooling body and having a cross section that widens towards the surface.

To form slag bodies of defined sizes, the surfaces of the casting rolls suitably are provided with opposite recesses complementing each other to form a mold cavity closed on all sides, which recesses advantageously are semi-spherically designed.

In order to ensure perfectly the penetration of gas through the slag present in the vessel, the vessel, on its lower end, advantageously is provided with a cooling gas entrance chamber widening with regard to the vessel in terms of cross section.

In order to prevent losses of hot gas via a slag discharge means, a secondary-gas duct enters below the slag discharge means, through which gas may be injected at a higher pressure than into the cooling gas entrance chamber.

In order to ensure an efficient cooling of the cooling body, the cooling body is covered by a liquid-cooled radiation protection screen relative to the vessel interior, the radiation protection screen being connected with the cavity of the cooling body in a duct-like manner.

BRIEF DESCRIPTION OF THE DRAWINGS

The invention will now be explained in more detail by way of several embodiments and with reference to the accompanying drawings, wherein.

DESCRIPTION OF EXEMPLARY EMBODIMENTS

Figure 1:
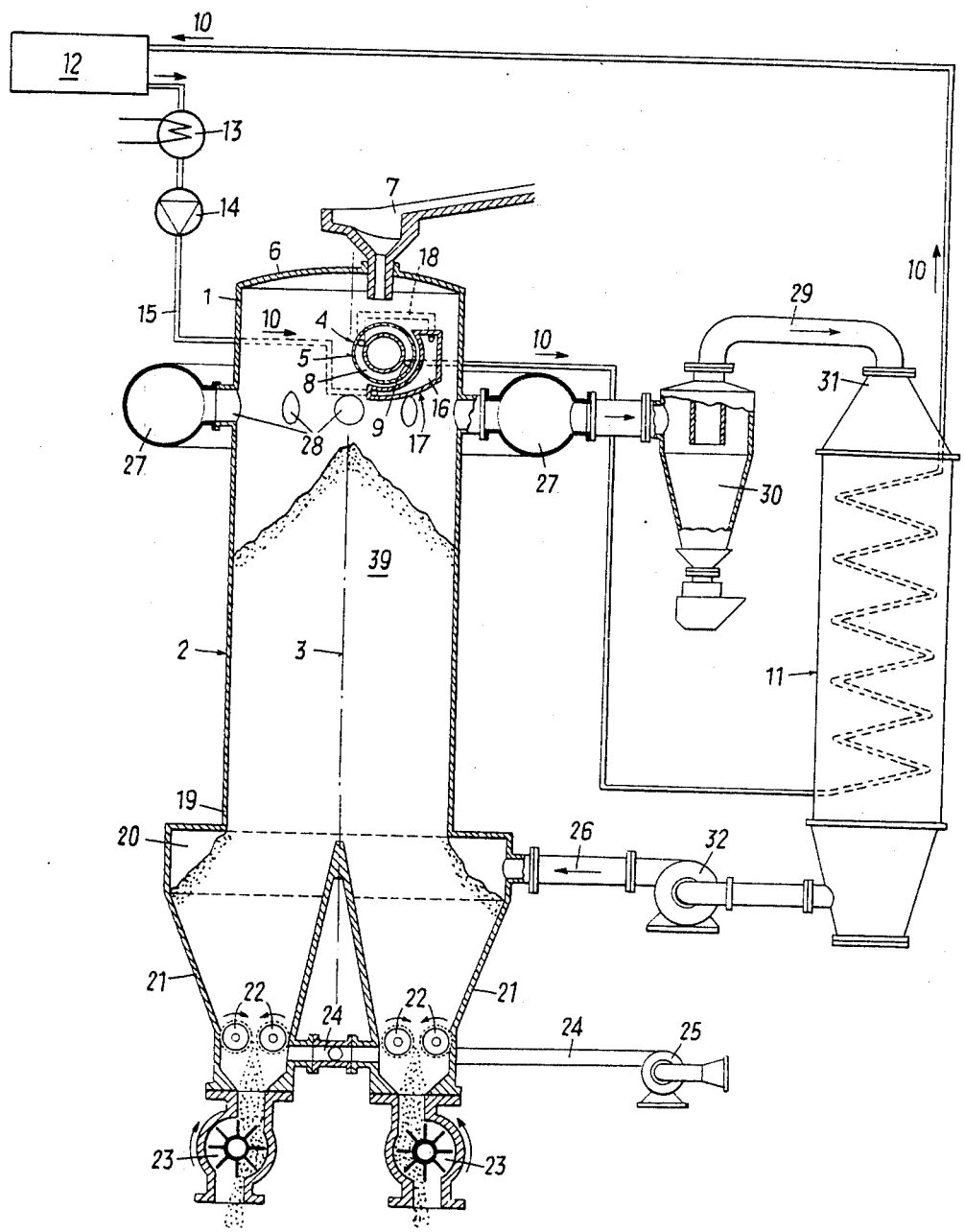
FIG. 1 illustrates an arrangement according to a first embodiment of the present invention in section.

Near the upper end 1 of a vessel 2 closed on all sides (also referred to as a cooling tower), having a substantially cylindrical shape and a vertical axis 3, a cooling body 4 designed as a cooling drum is rotatably mounted. Through the lid 6 of the vessel 2, a slag supply channel 7 is directed to the surface 5 of this cooling body 4. The cooling body 4 is provided with an internal cooling for a liquid medium. A piping 9 (drainage) draining the cooling liquid enters into its cavity 8, leading to a heat exchanger 11, in the flow direction 10 of the cooling liquid, and from there is guided to a heat consumer 12 and further on to a condenser 13 and a pump 14. From this pump 14, a cooling liquid supply conduit 15 enters into a cavity 16 of a radiation protection screen 17, through which the cooling liquid flows, the cooling liquid, after having flown through the same, being supplied to the cavity 8 of the cooling body 4 via the cooling liquid supply conduit 18.

The cooling tower 2, which optionally is provided with a wall cooling, on its lower end 19 passes over into a cooling gas entrance chamber 20 that is widened in the cross section perpendicular to the axis 3 and comprises downwardly conically narrowed funnels 21. To the funnels 21 slag discharge means 22 are connected, which, in the embodiment illustrated, are designed as spike rollers and also serve to break the slag. Below the spike rollers, bucket wheels 23 are provided, by which a dosed discharge of the slag particles is possible. Closely below the spike rollers 22, a gas duct 24 enters into the funnels 21, through which cooling gas, such as cooling air, is injectable into the funnels 21 by means of a fan 25.

A cooling gas entrance duct 26 enters into the cooling gas entrance chamber 20, which is widened relative to the cooling tower 20 in terms of cross section. Closely below the cooling body 4, the cooling tower is surrounded by an annular duct 27, which serves as a collection duct for the cooling gas flowing through the cooling tower 2 from bottom to top. This cooling gas leaves the cooling tower through openings 28.

From the annular duct 27 a cooling gas exit duct 29 is led to a cyclone dust separator 30, from which the gas duct 29 is led to one end 31 of the heat exchanger 11, through which the liquid cooling medium flows counter the gas. On the opposite end of the heat exchanger 11, the cooling gas leaves the same and is supplied back to the chamber 20 by a ventilator 32 so that the cooling gas, like the cooling liquid, is guided in a closed cycle to cool the cooling body.

Figure 3:
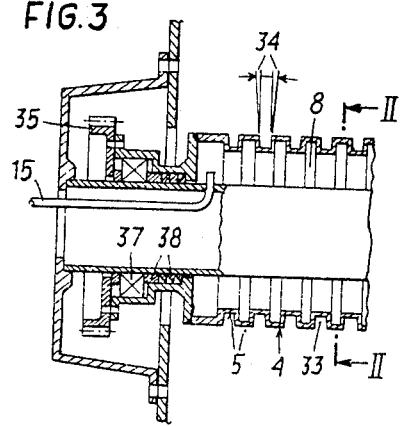
FIG. 3 is an illustration of a section taken along the line III—III of FIG. 2.
Figure 2:
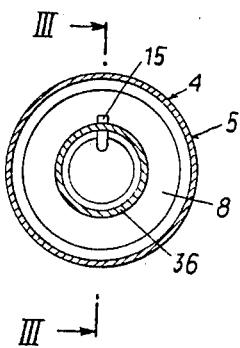
FIG. 2 shows a detail of FIG. 1 on an enlarged scale (taken along the line II—II of FIG. 3)

As is apparent from FIG. 3, the surface 5 of the cooling body 4 is provided with peripheral grooves 33. These peripheral grooves widen radially outwardly at an angle 34 of about 2° with respect to the radial direction. Driving of the cooling body 4 is effected via a toothed ring 35. As can also be seen from FIG. 3, the cooling body 4, which is designed as a cooling drum, is rotatably mounted on a tubular axle 36 by means of a bearing 37, the cooling liquid supplied through the cooling medium supply conduit 15 flowing into the annular cavity 8 formed by the axle 36 and the drum. Seals 38 are provided between the axle 36 and the cooling drum.

The arrangement functions in the following manner:

The slag supplied to the surface 5 of the cooling body 4 via the slag channel 7 and having a temperature of about 1,550° C., is cooled to about 1,100° C. by the cooling body 4, i.e., the slag solidifies on the surface of the cooling body 4. The cooling body 4 is set in rotation by a rotary drive (not illustrated). After the slag has completely solidified, the slag chips off the cooling body 4.

The chipped off slag 39 is collected in the cooling tower 2 and in the funnels 21 and is further cooled by the cooling gas flow, preferably by an air flow, from 1,100° C. to about 200° C. The additional cooling air coming in below the spike rollers 22 cools the slag by further 100° C. to about 100° C., after it has been disintegrated by the spike rollers.

The cooling air rising through the cooling tower 2 and heated by the slag reaches the heat exchanger 11 through the annular duct 27 and the cyclone dust separator 30, where it gives off its heat to the cooling liquid passing the heat exchanger 11 in counterflow.

Thus, the cooling liquid is heated not only by the heat given off to it by the slag via the cooling body and the radiation protection screen 17, but the heat that has been absorbed from the slag by the cooling gas is additionally supplied to it. Since the cooling body 4, in addition to the internal cooling, is provided also with an external cooling at least over 180° of its periphery, by means of a radiation protection screen 17 the cooling body is most effectively cooled so that a glassy solidification of the slag after contacting the surface 5 of the cooling body 4 is ensured and an agglomeration of the slag chipping off the surface 5 of the cooling body is prevented. The slag that has not automatically chipped off is scratched off by the radiation protection screen, which is moved to the surface 5 of the cooling body 4, by claws adapting to the shape of the drum.

The cooling water is supplied to the radiation protection screen 17 by means of the pump 14 at about 30° C., enters the cooling body at about 70° C. after having flown through the radiation protection screen 17 and leaves the cooling body at about 180° C. and a pressure of 10 bars. By the elevated pressure, the formation of bubbles within the cooling body 4 is prevented and an effective heat transfer to the cooling liquid is ensured, so that the slag will have completely solidified already at about 1/10 of the drum circumference of the cooling body 4.

The cooling air enters the chamber 20 at about 200° C. and is heated by the slag to about 600° C., at which temperature the cooling gas leaves the cooling tower 2. The ventilator 32 urges the cooling gas into the cooling gas entrance chamber 20 at about 1.5 bars and takes it in from the heat exchanger 11 at a slight negative pressure of about 0.5 bars. The additional cooling gas, which is supplied below the spike rollers 22, is injected at a pressure slightly larger than 1.5 bars in order to ensure a sealing of the funnels 21 downwardly and to replace the air escaping from the system.

The heat exchanger 11 operates according to the counterflow principle, with the water introduced into the heat exchanger 11 at about 180° C. evaporating. The steam leaves the heat exchanger 11 at about 600° C. and is supplied to the consumer at this temperature. The cooling gas leaves the heat exchanger 11 at about 200° C. The steam worked off by the heat consumer 12 is cooled to about 30° C. and liquefied in the optionally required condenser 13.

The particularity of the method according to the invention is to be seen in the fact that the slag is cooled in two steps. The first cooling step takes place by indirect liquid cooling over the well cooled surface 5 of the cooling body 4 to closely below the solidification temperature, wherein it is important that the slag solidifies all through in a glassy manner. The second cooling step takes place from about 1,100° C. downward by direct gas cooling. By the first step, a harsh cooling is effected, thus ensuring the glassy solidification and the complete solidification. In the second step, an almost overall heat transmission from the slag to the cooling gas is effected.

The immediate contact of the slag jet with the cooled surface 5 of the cooling body 4 enables the extremely rapid cooling of the slag on account of the heat accumulating ability of the material of the cooling body 4 and on account of the ratio of cooling body weight to slag to be cooled of about 2:1. It is of importance that the surface 5 is free of slag over ¾ of its periphery and is also cooled from outside over half of its periphery by means of a radiation protection screen 17.

Figure 4:
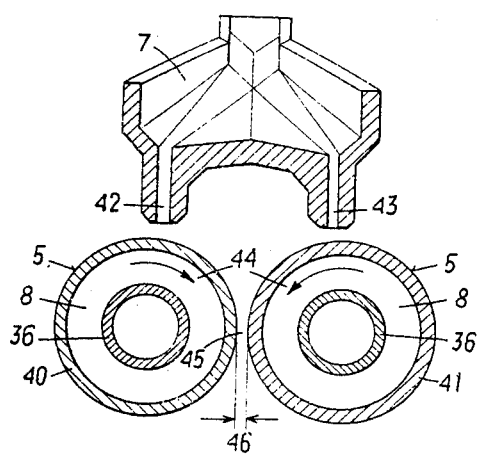
FIGS. 4 and 5 represent further embodiments of the present invention in illutrations analogous to FIG. 2.

In FIG. 4 an exemplary embodiment is illustrated, in which two counterwisely driven cooling drums 40, 41 acting as casting rolls are provided as cooling body, the slag supply channel 7 being provided with two mouths 42, 43. The cooling drums 40, 41, with their surfaces 5, rotate towards each other, seen from above (in the direction of the arrows 44). Between the cooling drums 40, 41 a gap 45 having a certain width 46 is provided; this gap 45 enables the passage of the slag. The mouths 42, 43 of the slag channel 7 each lie close to the highest elevation of the cooling drums 40, 41, in the moving direction 44, so that the slag reliably is carried in the direction to the respective oppositely arranged cooling drum and an overflow of the slag towards outside is prevented.

It is possible to provide the cooling drums 40, 41 with smooth surfaces 5, as illustrated in FIG. 4, or to provide the two cooling drums with circumferential grooves 33, according to FIG. 3, an elevation of the opposite cooling drum projecting into one groove 33 each.

Figure 5:
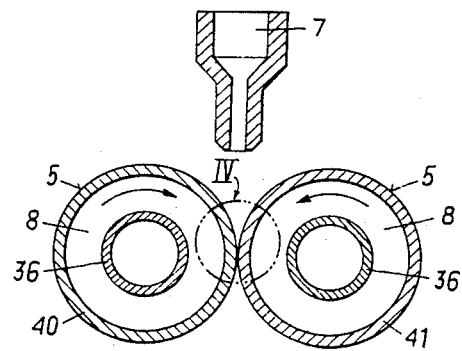
Figure 6:
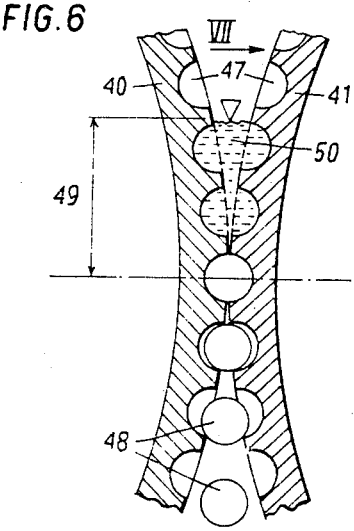
FIG. 6 shows a detail VI of FIG. 5 on an enlarged scale.
Figure 7:
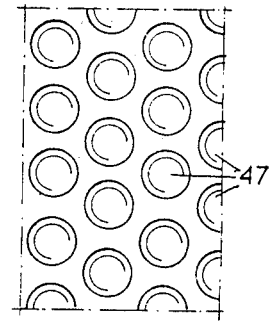
FIG. 7 illustrates a view of the surface of the cooling bodies represented in FIGS. 5 and 6, taken in the direction of the arrow VII of FIG. 6.

According to the embodiment illustrated in FIGS. 5 and 6, the surfaces 5 of the cooling drums 40, 41 contact each other. They are provided with recesses 47 which are designed approximately semi-spherical, the recesses 47 of the two oppositely arranged cooling drums complementing each other so as to form spherical hollows at the line of contact so that slag particles 48 are formed that have the dimensions of these spherical hollows. The slag supply is kept so large that the height 49 of the slag sump 50 forming between the cooling drums 40, 41 is as slight as possible.

What we claim is:

1. In a method for recovering the sensible heat of slag, such as blast furnace slag, in which slag in a liquid state is solidified on the surface of a hollow cooling body, preferably designed as a cooling drum, and provided with a liquid internal cooling means comprising a liquid cooling medium, said slag being indirectly cooled by said liquid internal cooling, and said liquid cooling medium of said liquid internal cooling means is guided in a liquid-cooling-medium thermodynamic cyclic process, the improvement comprising the steps of
    indirectly intensively cooling the liquid slag on the surface of said cooling body by said liquid cooling medium to a temperature closely below the solidification temperature in a first cooling step so as to solidify said slag throughout,
    separating said solidified slag from the surface of said cooling body,
    obtaining a heated gas flow by directly cooling said separated solidified slag in a second cooling step by a gas flow, and
    leading said heated gas flow in a gas-flow thermodynamic cyclic process.

2. A method as set forth in claim 1, wherein said slag is cooled to about 1,100° C. by said liquid cooling medium and is cooled from about 1,100° C. to about 200° C. by said gas flow.

3. A method as set forth in claim 1, wherein the heat absorbed by said gas flow is supplied to said liquid cooling medium heated by said slag.

4. A method as set forth in claim 1, wherein said liquid cooling medium is guided in a closed cycle at an elevated pressure.

5. A method as set forth in claim 1, wherein said gas flow is guided in a closed cycle.

* * * * *

UNITED STATES PATENT AND TRADEMARK OFFICE
CERTIFICATE OF CORRECTION

PATENT NO. : 4,572,281

DATED : Feb. 25, 1986

INVENTOR(S) : Müllner et al.

It is certified that error appears in the above-identified patent and that said Letters Patent is hereby corrected as shown below:

First page, 2nd col., add to the list of "FOREIGN PATENT DOCU-
MENTS" the following references:

```
--2759205   7/1978   Fed. Republic of Germany
  3122059   3/1982   Fed. Republic of Germany
    34613   3/1980   Japan--.
```

Col. 3, line 29, "illutrations" should read --illustrations--;

Col. 4, line 61, delete the comma after "periphery"; and line 62, insert a comma after "17".

Signed and Sealed this

Twenty-fourth Day of June 1986

[SEAL]

Attest:

DONALD J. QUIGG

Attesting Officer

Commissioner of Patents and Trademarks